United States Patent
Lang et al.

(10) Patent No.: US 11,263,035 B2
(45) Date of Patent: Mar. 1, 2022

(54) LONGEVITY BASED COMPUTER RESOURCE PROVISIONING

(71) Applicant: Microsoft Technology Licensing, LLC, Redmond, WA (US)

(72) Inventors: Willis Lang, Minneapolis, MN (US); Jose Manuel Picado Leiva, Corvallis, OR (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 361 days.

(21) Appl. No.: 15/953,131

(22) Filed: Apr. 13, 2018

(65) Prior Publication Data

US 2019/0317788 A1    Oct. 17, 2019

(51) Int. Cl.
*G06F 9/455* (2018.01)
*G06N 20/00* (2019.01)
*G06F 9/50* (2006.01)

(52) U.S. Cl.
CPC ........ *G06F 9/45558* (2013.01); *G06F 9/5077* (2013.01); *G06N 20/00* (2019.01); *G06F 2009/4557* (2013.01); *G06F 2009/45562* (2013.01)

(58) Field of Classification Search
CPC ............... G06F 9/45558–52; G06N 20/00–20
See application file for complete search history.

(56) References Cited

U.S. PATENT DOCUMENTS

| | | | |
|---|---|---|---|
| 8,881,142 B1 * | 11/2014 | Reid | G06F 9/485 718/1 |
| 9,438,466 B1 | 9/2016 | O'Gorman et al. | |
| 2013/0185729 A1 | 7/2013 | Vasic et al. | |
| 2014/0082165 A1 | 3/2014 | Marr et al. | |
| 2014/0157038 A1 * | 6/2014 | Ashok | G06F 9/44 714/2 |
| 2015/0339583 A1 * | 11/2015 | McQueen | G06N 20/00 706/12 |

(Continued)

FOREIGN PATENT DOCUMENTS

EP    1939742 A2    7/2008

OTHER PUBLICATIONS

Resource Central: Understanding and Predicting Workloads for Improved Resource Management in Large Cloud Platforms Eli Cortez, Anand Bonde, Alexandre Muzio, Mark Russinovich, Marcus Fontoura, Ricardo Bianchini (Year: 2017).*

(Continued)

*Primary Examiner* — Emerson C Puente
*Assistant Examiner* — Paul V Mills
(74) *Attorney, Agent, or Firm* — Fiala & Weaver P.L.L.C.

(57) ABSTRACT

Computer resources are provisioned for a virtual machine based on expected lifespan. After a request to create a virtual machine is received, the virtual machine can be classified into one of a plurality of longevity classes utilizing a machine learning classifier based on data pertaining to the requestor or the virtual machine. The longevity classes capture different lifespans of the virtual machine between when the virtual machine is created and when the virtual machine is deleted. Subsequently, resources for the virtual machine are provisioned from a hardware resource pool of a set of disjoint resource pools specific to the longevity class of the virtual machine.

20 Claims, 7 Drawing Sheets

(56) References Cited

U.S. PATENT DOCUMENTS

| | | | | |
|---|---|---|---|---|
| 2016/0019471 | A1* | 1/2016 | Shin | G10L 15/00 |
| | | | | 706/12 |
| 2016/0162308 | A1* | 6/2016 | Chen | G06F 9/45558 |
| | | | | 718/1 |
| 2017/0178020 | A1* | 6/2017 | Duggan | G06F 9/50 |
| 2017/0286867 | A1* | 10/2017 | Bell | G06N 3/0445 |
| 2017/0364383 | A1* | 12/2017 | Feng | G06F 9/4887 |
| 2018/0144272 | A1* | 5/2018 | Moroo | G06F 9/505 |
| 2018/0203739 | A1* | 7/2018 | Brady | G06F 9/45558 |
| 2019/0220294 | A1* | 7/2019 | Horie | G06F 9/45533 |

OTHER PUBLICATIONS

JamaisVu: Robust Scheduling with Auto-Estimated Job Runtimes Alexey Tumanov, Angela Jiang, Jun Woo Park, Michael A. Kozuch, Gregory R. Ganger CMU-PDL-16-104 (Year: 2016).*

Real-time Prediction of Length of Stay Using Passive Wi-Fi Sensing True Viet Le, Baoyang Song, Laura Wynter (Year: 2017).*

Integrating Clustering and Learning for Improved Workload Prediction in the Cloud Yongjia Yu, Vasu Jindal, I-Ling Yen, Farokh Bastani (Year: 2016).*

Intelligent Management of Virtualized Resources for Database Systems in Cloud Environment Pengcheng Xiong, Yun Chi, et al. (Year: 2011).*

Automatic Virtual Machine Configuration for Database Workloads Ahmed A. Soror, Umar Farooq Minhas, Ashraf Aboulnaga, and Kenneth Salem (Year: 2010).*

Workload Characterization and Prediction in the Cloud: A Multiple Time Series Approach Arijit Khan, Xifeng Yan, Shu Tao, Nikos Anerousis (Year: 2012).*

Highly Accurate Prediction of Jobs Runtime Classes Anat Reiner-Benaim, Anna Grabarnick (Year: 2016).*

Evaluating Randomness in Cyber Attack Textual Artifacts Xuan Zhao, Jay Luan, Matt Wolff (Year: 2016).*

Exploiting Spatio-Temporal Tradeoffs for Energy-Aware MapReduce in the Cloud Michael Cardosa, Aameek Singh, Himabindu Pucha, and Abhishek Chandra (Year: 2012).*

Survivability of Cloud Databases—Factors and Prediction Jose Picado, Willis Lang, Edward C. Thayer (Year: 2018).*

"Algorithms", Retrieved from: https://web.archive.org/web/20140223011151/https://www.kaggle.com/wiki/Algorithms, Retrieved on: Nov. 9, 2017, 3 Pages.

"Azure SQL Database Pricing", Retrieved from: https://azure.microsoft.com/en-us/pricing/details/sql-database/managed/, Retrieved on: Nov. 9, 2017, 9 Pages.

"Lifelines", Retrieved from: https://web.archive.org/web/20170724014119/https://lifelines.readthedocs.io/en/latest/, Jul. 24, 2017, 2 Pages.

"Newsroom", Retrieved From: https://web.archive.org/web/20180518051500/https://www.gartner.com/newsroom/id/3815165, Oct. 12, 2017, 3 Pages.

Bernstein, et al., "Adapting Microsoft SQL Server for Cloud Computing", In Proceedings of the IEEE 27th International Conference on Data Engineering, Apr. 11, 2011, pp. 1255-1263.

Biau, Gerard, "Analysis of a Random Forests Model", In Journal of Machine Learning Research, vol. 13, Issue 1, Jan. 2012, pp. 1063-1095.

Bose, et al., "Probabilistic Demand Forecasting at Scale", In Proceedings of the VLDB Endowment, vol. 10, Issue 12, Aug. 2017, pp. 1694-1705.

Boutin, et al., "JetScope: Reliable and Interactive Analytics at Cloud Scale", In Proceedings of the 41st International Conference on Very Large Data Bases, vol. 8, Issue 12, Aug. 2015, pp. 1680-1691.

Breiman, Leo, "Random Forests", In Journal of Machine Learning, vol. 45, Issue 1, Oct. 2001, pp. 5-32.

Caruana, et al., "An Empirical Comparison of Supervised Learning Algorithms", In Proceedings of the 23rd International Conference on Machine Learning, Jun. 25, 2006, pp. 161-168.

Das, et al., "Automated Demand-Driven Resource Caling in Relational Database-as-a-Service", In Proceedings of the International Conference on Management of Data, Jun. 26, 2016, 12 Pages.

Das, et al., "CPU Sharing Techniques for Performance Isolation in Multi-tenant Relational Database-as-a-Service", In Proceedings of the VLDB Endowment, vol. 7, Issue 1, Sep. 2013, pp. 37-48.

Duggan, et al., "Performance Prediction For Concurrent Database Workloads", In Proceedings of the ACM SIGMOD International Conference on Management of Data, Jun. 12, 2011, pp. 337-348.

Elmore, et al., "Characterizing Tenant Behavior For Placement And Crisis Mitigation In Multitenant DBMSs", In Proceedings of the ACM SIGMOD International Conference on Management of Data, Jun. 22, 2013, pp. 517-528.

Goldbloom, et al., "Lessons from 2 Million Machine Learning Models on Kaggle", Retrieved from: https://www.kdnuggets.com/2015/12/harasymiv-lessons-kaggle-machine-learning.html, Dec. 2015, 5 Pages.

Greenberg, et al., "The Cost of a Cloud: Research Problems in Data Center Networks", In Journal of ACM SIGCOMM Computer Communication Review, vol. 39, Issue 1, Jan. 2009, pp. 68-73.

Hastie, et al., "The Elements of Statistical Learning", In Publication of Springer, Jan. 2001, 764 Pages.

Kaplan, et al., "Nonparametric Estimation from Incomplete Observations", In Journal of the American Statistical Association, vol. 53, No. 282, Jun. 1958, pp. 457-481.

Kleinbaum, et al., "Survival Analysis: A Self-Learning Text", In Publication of Springer, Jan. 2005, 596 Pages.

Lang, et al., "Microsoft Azure SQL Database Telemetry", In Proceedings of the Sixth ACM Symposium on Cloud Computing, Aug. 27, 2015, pp. 189-194.

Lang, et al., "Not for the Timid: On the Impact of Aggressive Over-booking in the Cloud", In Proceedings of the VLDB Endowment, vol. 9, No. 13, Sep. 2016, pp. 1245-1256.

Li, et al., "Understanding Data Survivability in Archival Storage Systems", In Proceedings of the 5th Annual International Systems and Storage Conference, Jun. 4, 2012, 12 Pages.

Marcus, et al., "Wisedb: A Learning-Based Workload Management Advisor for Cloud Databases", In Proceedings of the VLDB Endowment, vol. 9, Issue 10, Jun. 2016, pp. 780-791.

Mozafari, et al., "Performance And Resource Modeling In Highly-Concurrent OLTP Workloads", In Proceedings of the ACM SIGMOD International Conference on Management of Data, Jun. 22, 2013, pp. 301-312.

Narasayya, et al., "Sharing Buffer Pool Memory in Multi-tenant Relational Database-as-a-service", In Proceedings of the VLDB Endowment, vol. 8, Issue 7, Feb. 2015, pp. 726-737.

Narasayya, et al., "SQLVM: Performance Isolation in Multi-tenant Relational Database-as-a-Service", In Proceedings of the 6th Biennial Conference on Innovative Data Systems Research, Jan. 6, 2013, 9 Pages.

Park, et al., "Database Learning: Toward a Database that Becomes Smarter Every Time", In Proceedings of the ACM International Conference on Management of Data, May 14, 2017, pp. 587-602.

"International Search Report & Written Opinion Issued in PCT Application No. PCT/US19/024168", dated Jun. 25, 2019, 11 Pages.

Pedregosa, et al., "Scikit-learn: Machine Learning in Python", In Journal of Machine Learning Research, vol. 12, Oct. 2011, pp. 2825-2830.

Pelkonen, et al., "Gorilla: A Fast, Scalable, in-Memory Time Series Database", In Proceedings of the VLDB Endowment, vol. 8, No. 12, Aug. 2015, pp. 1816-1827.

Pinheiro, et al., "Failure Trends in a Large Disk Drive Population", In Proceedings of the 5th USENIX Conference on File and Storage Technologies, Feb. 13, 2007, pp. 17-29.

Polyzotis, et al., "Data Management Challenges in Production Machine Learning", In Proceedings of the ACM International Conference on Management of Data, May 14, 2017, pp. 1723-1726.

Schaffner, et al., "Predicting in-Memory Database Performance for Automating Cluster Management Tasks", In Proceedings of the IEEE 27th International Conference on Data Engineering, Apr. 2011, 12 Pages.

(56) References Cited

OTHER PUBLICATIONS

Taft, et al., "STeP: Scalable Tenant Placement for Managing Database-as-a-Service Deployments", In Proceedings of the Seventh ACM Symposium on Cloud Computing, Oct. 5, 2016, pp. 388-400.
Viswanathan, et al., "Predictive Provisioning: Efficiently Anticipating Usage in Azure Sql Database", In Proceedings of the IEEE 33rd International Conference on Data Engineering, Apr. 2017, pp. 1111-1116.
Zadrozny, et al., "Obtaining Calibrated Probability Estimates from Decision Rees and Naive Bayesian Classifiers", In Proceedings of the Eighteenth International Conference on Machine Learning, Jun. 28, 2001, 8 Pages.

* cited by examiner

LONGEVITY BASED COMPUTER RESOURCE PROVISIONING

BACKGROUND

Cloud service providers provide computing resources to individuals and businesses over the internet thereby enabling customers to rent standardized hardware and software rather than purchasing the hardware and software. Service providers generally compete against one another within measurable categories such as price, feature set, performance, and user experience/satisfaction. While surveying customers is a well-established method of understanding which categories need improvement and what users would like to see, cloud service providers also have vast quantities of data generated by their service that can be data mined. The cloud service provider that is most quickly able to exploit this data will have a highly desirable advantage.

Understanding user behavior and usage patterns is significant. It is the first step to improving operating efficiency (lowering costs) and maintaining stable performance and high user satisfaction by minimizing service disruptions. There has been substantial research interest in this regard with respect to cloud database services. More specifically, modeling database workload patterns and predicting user behavior have been studied. Some studies focus on learning about user workloads and resource demands of queries. For example, a database service provider can take workload and utilization data that the provider acquires to either efficiently allocate resources or help the database execute faster.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to longevity-based computer resource provisioning. After creation, a virtual machine is classified into one of a plurality of longevity classes with a machine learning classifier based on characteristics of a creating user and features of the virtual machine. The longevity classes capture different expected lifespans of a virtual machine between when the virtual machine is created and when the virtual machine is deleted. For example, longevity classes can comprise short lived (e.g., equal or less than thirty days) or long lived (e.g., greater than thirty days). Resources for the virtual machine are subsequently provisioned from a hardware resource pool, of a set of disjoint resource pools, specific to the longevity class of the virtual machine. In this manner, resource provisioning decisions are based on predicted classification of virtual machine longevity.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the disclosed subject matter. Other advantages and novel features may become apparent from the following detailed description when considered in conjunction with the drawings.

DETAILED DESCRIPTION

Figure 1:
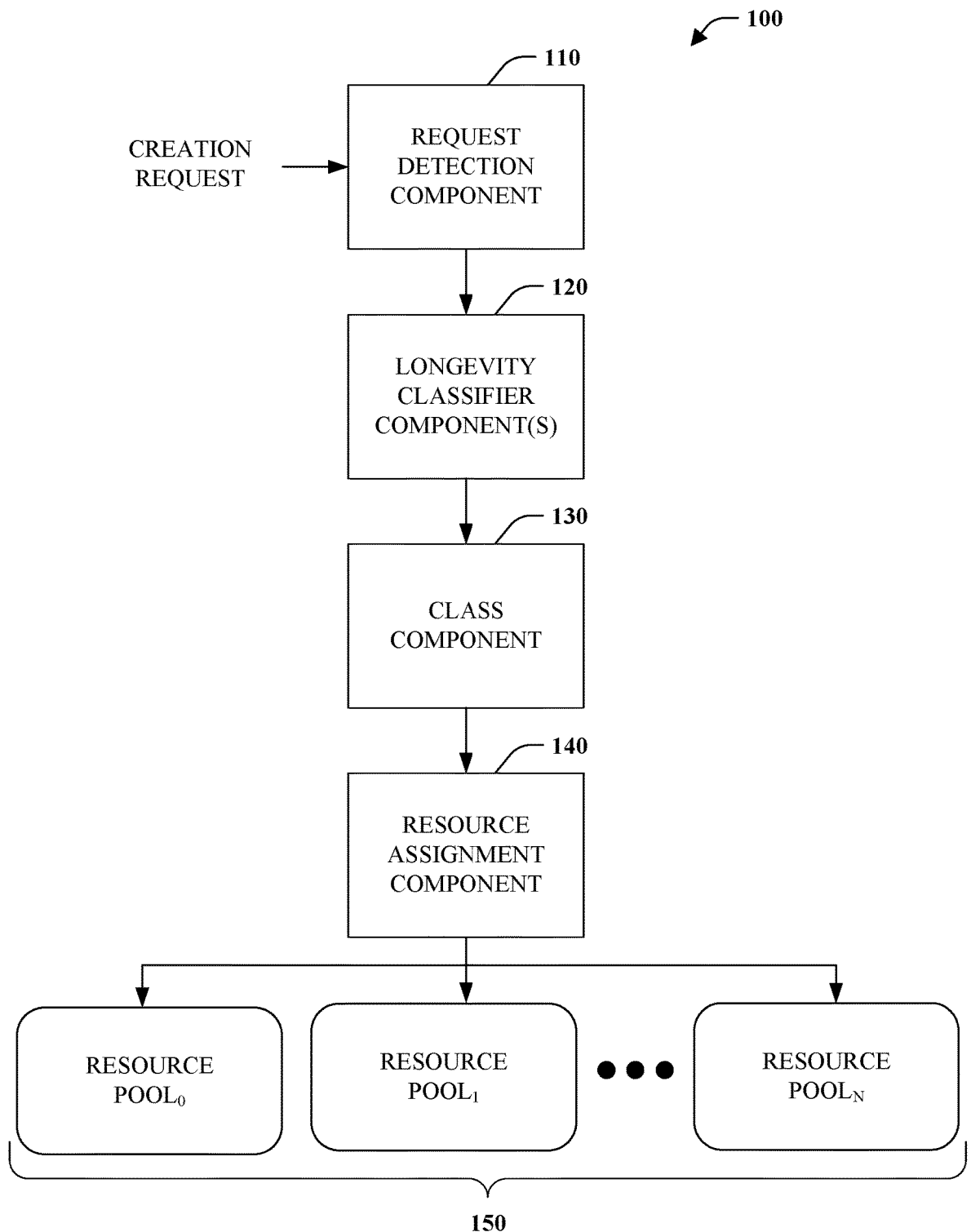
FIG. 1 is a schematic block diagram of a resource provisioning system.

Utilization and workload analysis are conventionally considered in assigning resources to virtual machines. Predicted utilization patterns or utilization levels have been employed for optimal placement. For example, resources can be assigned to a database of cloud service customers, or subscribers, based on the type of queries that are run and the workload involved. In other words, utilization and workload over a created and undeleted virtual machine is considered in resource allocation.

Details below generally pertain to longevity-based computer resource provisioning. Longevity refers to the lifespan of a virtual machine. Stated differently, longevity captures how long a virtual machine, or the like, is expected to survive between creation and deletion times. One or more machine learning classifiers can be trained and utilized to predict the lifespan of a newly created virtual machine and classify the virtual machine into one of a plurality of longevity classes based on various features such as subscriber identity and virtual machine properties. Hardware resources can be assigned to a virtual machine from disjoint resource pools as a function of longevity class such that virtual machines with similar expected lifespans are co-located. For example, a virtual machine that is long-lived (e.g., greater than thirty days) can be assigned to a resource pool designated for long-lived virtual machines, whereas a virtual machine that is short lived (e.g., less than or equal to thirty days) can be assigned to a resource pool designated for short-lived virtual machines.

Many advantages can be afforded by a resource provisioning scheme that co-locates virtual machines in disjoint resource pools based on expected lifespans. For instance, co-locating long-lived virtual machines alleviates resource contention for the long-lived virtual machines from short-lived virtual machines being created and deleted, which provides better quality of service. In other words, identifying and segmenting virtual machines that cycle frequently versus infrequently with respect to creation and deletion can eliminate noisy neighbor issues. Additionally, service disruptions on short-lived virtual machines due to maintenance can be reduced since some non-critical software patches (e.g., new features) may not need to be applied for a virtual machine that will be deleted shortly. Further, better cluster provisioning and load balance can be achieved since resource pools can be classified based in part on how often virtual machines are created and deleted. For example, a short-lived resource pool can have a fullness threshold tolerance that is different from the long-lived resource pool. Consequently, by having different resource pools, it is possible that the sum-total free capacity slack can be less than if there was only a single resource pool for all virtual machines. Put another way, the sum-total free capacity that could be utilized but is not being utilized can be less when different resource pools are employed than when a single resource pool is employed, thereby rendering use of different resource pools more efficient than a single resource pool.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Referring initially to FIG. 1, a resource provisioning system 100 is illustrated. The resource provisioning system 100 provides resources for virtual machines. A virtual machine comprises a computer file, called an image, that simulates a computer and is backed by physical hardware provided by a host computer or set of computers. More specifically, a virtual machine includes virtual hardware, such as central processing units, memory, hard drives, and other devices, which is mapped to real physical hardware. The resource provisioning system 100 provides the hardware resources for created virtual machines including compute and storage resources, among other resources (e.g., memory). Furthermore, a virtual machine can execute various operating systems and applications deployed thereon including server applications such as a database server or web server. Stated differently, one instance of a virtual machine can be a database server or web server.

The resource provisioning system 100 includes request detection component 110, longevity classifier component 120, class component 130, and resource assignment component 140. The request detection component 110 is a mechanism that detects a request to create a virtual machine, for instance from a user or subscriber to a cloud service. The request detection component 110 passes information pertaining to the request including a user identifier and virtual machine properties to the longevity classifier component 120. The longevity classifier component 120 is a machine-learning classifier that learns and determines expected lifespan of a virtual machine based on that learning. The class component 130 receives input from the longevity classifier components 120 and assigns one of a plurality of longevity classes to the created virtual machine. For example, a virtual machine can be classified into a short-lived class (e.g., less than or equal to thirty days) or a long-lived class (e.g., greater than 30 days). The resource assignment component 140 is a mechanism that assigns or provisions resources for the virtual machine from a set of disjoint hardware resource pools 150 (RESOURCE POOL$_0$-RESOURCE POOL$_N$, wherein N is a positive number greater than or equal to one). Moreover, the resource pool is selected based on the longevity class of the virtual machine, such that a resource pool corresponding to a particular longevity class is chosen. For instance, a resource pool specific to a short-lived class can be selected or a resource pool corresponding to a long-lived class can be selected.

The longevity classifier component 120 employs machine learning to automatically predict expected lifespan, or longevity, of a virtual machine. Further, in accordance with one implementation, the longevity classifier component 120 can automatically predict lifespan with a specific degree of confidence. For example, the longevity classifier component 120 can produce a predictive score associated with classification of a virtual machine based on a set of features determined to be useful in predicting longevity. By way of example, such features can include, but are not limited to, creation time, name, size, performance level, subscription type, and subscription history. For instance, the longevity classifier component 120 can produce a predictive score regarding whether a virtual machine will have a lifespan of greater than thirty days that indicates a confidence level associated with the prediction. In this case, an exemplary score can be ninety indicating that the virtual machine has a lifespan greater than thirty days with ninety percent confidence. Furthermore, more than one longevity classifier can be employed to enable accurate predictions of expected lifespan, or longevity, based on a set of classifiers. For instance, an additional longevity classifier component 120 can be employed to predict the likelihood that a virtual machine will have a lifespan of less than or equal to thirty days. Further, different classifiers can vary in terms of features (e.g., subset of features), training data (e.g., recent data vs. all data), classes (e.g., long, short or medium lived), and learning algorithms, among other things.

The class component 130 can receive predictions from one or more longevity classifier components 120 and ascribe a class to a virtual machine based thereon. In one instance, the class component 130 can employ a predetermined or configurable threshold with which to classify a virtual machine. By way of example, consider a binary classification of long lived (e.g., greater than thirty days) and short lived (e.g. less than or equal to thirty days). In the case of a single longevity classifier, a threshold can be set such that the virtual machine will be classified as long lived if the classifier produces a predictive score of ninety or above, and otherwise the virtual machine will be classified as short lived. Alternatively, if there are two longevity classifiers, the classification of a virtual machine can be long lived if a first classifier generates a predictive score of ninety or above and short lived if the second classifier produces a predictive score of ninety or above.

A third classification option, in addition to short lived and long lived, is unknown. The unknown class can also be employed with respect to one or more thresholds. For example, if a predicted score is less than a threshold "t1," a virtual machine can be classified as short lived, and if the predictive score is greater than a threshold "t2," the virtual machine can be classified as long lived. Otherwise, the virtual machine can be classified as unknown. Virtual machines classified as unknown can be reevaluated at a later time with further information available for classification as short lived or long lived, for example.

In accordance with one embodiment, the longevity classifier component 120 can identify a class as well as a probability of belonging to the class. As described above, the probability is used to determine the class (as well as a threshold) by the class component 130. However, the longevity classifier component 120 can also be embodied as a classifier that does not output probabilities. Rather, such a classifier will simply indicate whether or not a virtual machine belongs to the class. In this case, the class component 130 can be bypassed since the longevity classifier component 120 has the final say as to classification of the virtual machine.

As disclosed above, the resource provisioning system 100 can classify a virtual machine as short lived, meaning survival of less than or equal to thirty days, long lived, meaning survival of greater than thirty days, or unknown. However, the resource provisioning system 100 is not limited thereto. In fact, the number of classes as well as the boundaries between classes are configurable. By way of example, and not limitation, an additional middle-aged class between short lived and long lived can be introduced perhaps meaning survival between fifteen and thirty-five days.

The resource assignment component 140 can provision resources for a virtual machine based on the class to which the virtual machine belongs. The disjoint hardware resource pools 150 can have correspondence to particular classes, such that a virtual machine belonging to a first class is assigned allocated resources from a particular resource pool corresponding to the first class. In this manner, virtual machines can be segmented and co-located with similar virtual machines in terms of longevity. In one instance each resource pool can have the same or similar hardware resources. However, resource pools may be heterogeneous. In one embodiment, in fact, resources can be tailored to classes. By way of example, and not limitation, a resource pool associated with short-lived virtual machines can include solid state devices to handle random input and output occurring with creation and deletion of virtual machines.

As an exemplary use case for the resource provisioning system 100, consider a cloud service provider system in a geographical region with limited resources. Conventionally, the system could run out of capacity. In that case, no customers could create virtual machines. Further, customers may be unable to create virtual machines when the capacity is low. The resource provisioning system 100 enables discrimination between short-lived and long-lived virtual machines. Accordingly, even when capacity is low, a set of resources could be allocated to allow continuous creation and deletion of virtual machines. Further, by segmenting resources for short-lived and long-lived virtual machines, long-lived virtual machines will not be affected by frequent creation and deletion in a separate resource cluster.

Figure 2:
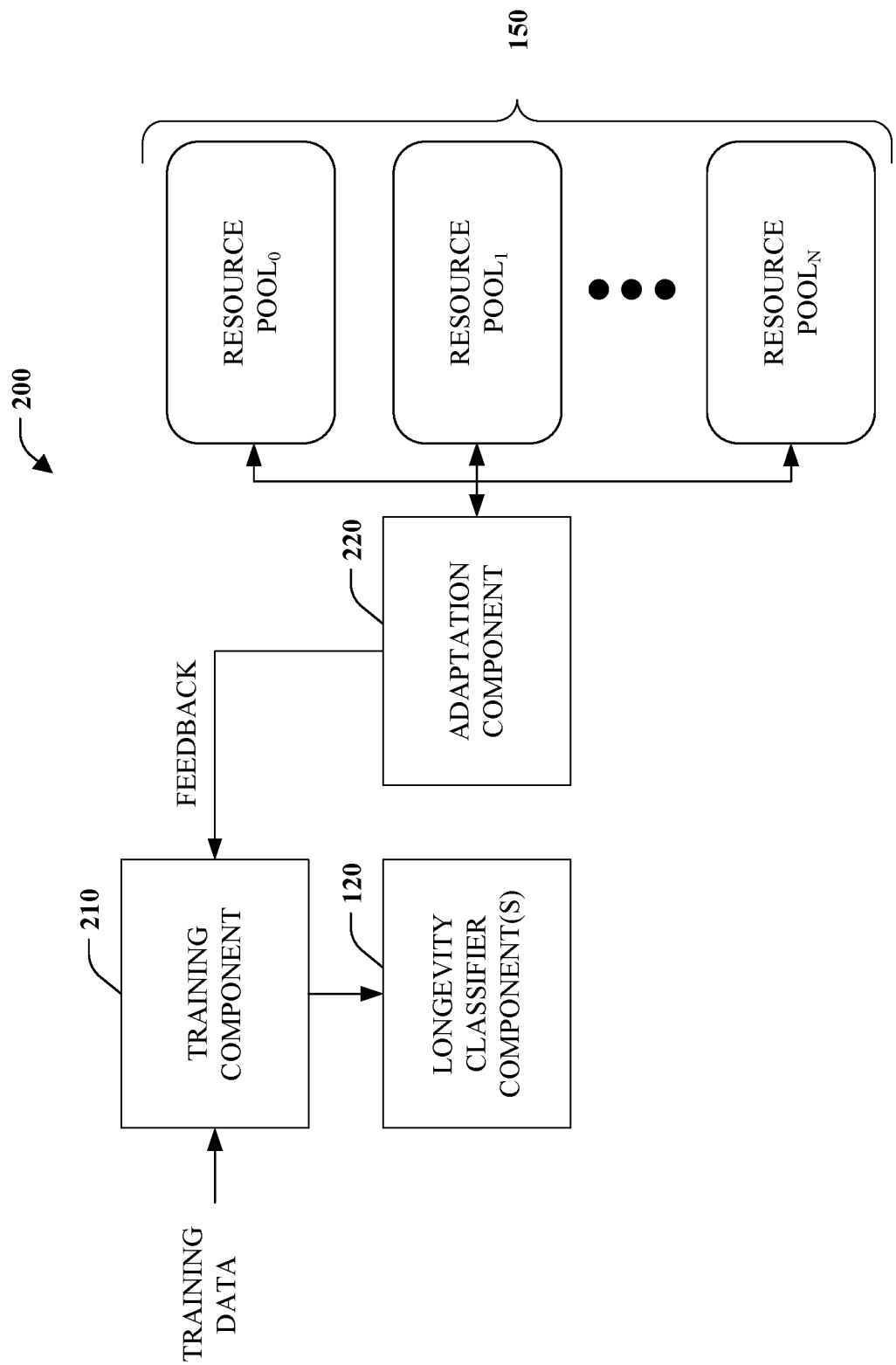
FIG. 2 is a schematic block diagram of a classifier training system.

Turning attention to FIG. 2, a classifier training system 200 is depicted. The classifier training system 200 includes the longevity classifier component 120 of FIG. 1, training component 210, adaptation component 220, and resource pools 150. The training component 210 acquires training data and employs such data to train the longevity classifier component 120. As previously indicated, the longevity classifier component 120 can be a machine learning component. In a supervised machine learning task, given the training data "$D=\{(x_1, y_1), \ldots, (x_n, y_n)\}$" the objective is to learn a model "h" that approximates the function "f" such that "$f(x_i)=y_i$." Each item "$(x_i, y_i)$" that is a member of "D" can be called a training example. In a classification task, "$y_i$" is a categorical value, while in a regression task, "$y_i$" is a numerical value. Each vector "$x_i$" comprises a set of features, where each feature represents a property of training example "i." In accordance with one implementation, the longevity classifier component 120 can be embodied as a random forest model that is an ensemble of decision trees. Each tree is learned independently using a subset of features, which can be selected randomly. The final prediction of a random forest model is obtained by aggregating over predictions of all learned trees. Random forests serve as a general-purpose technique, are fast to train, and have been shown to produce highly accurate predictions. Of course, other machine learning technologies can also be employed including neural networks, Bayesian belief networks, or expert systems, among others. Further, training component 210 is not limited to supervised learning but can also employ unsupervised learning.

The training data, or training example, can be acquired from information captured about prior virtual machines. This information can be readily available since cloud service providers collect such information at least for billing purposes. For example, for each virtual machine, collected information can be the user, customer, or subscriber id, the creation time, the deletion time, the virtual machine name, size, and performance level, as well as subscription type and history. Additional features can also be computed from such collected information for use in training a classifier.

Creation time can include the date and time in which the virtual machine is created. Date and time can be localized for the region in which the virtual machine is hosted. Next, the following features can be computed:

Day of the week (1-7)
Day of the month (1-31)
Week of year (1-52)
Month of year (1-12)
Hour of day (0-23)

These features allow the model to capture temporal patterns. For instance, the model may discover that virtual machines created on the weekends tend to live less than thirty days. One reason for this trend may be the virtual machine is created and deleted by an automated process.

A virtual machine can be named upon creation. If a database is deployed on the virtual machine, the virtual machine and the database can be named. For names, the following features can be computed:

Length
Number of distinct characters
Distinct character rate (number of distinct characters/length)
Whether name includes letters and digits
Whether name includes uppercase and lowercase letters
Whether name includes non-alphanumeric symbols In this manner, a determination can be made regarding whether or not a virtual machine or database is created manually or by an automated process. For instance, a name that is manually written by a user may have a low character rate, as the words comprising the name may include multiple repeated characters. On the other hand, a randomly created name generated by an automated process is more likely to have a high character rate.

Storage size of a virtual machine or deployed database may change over time. Features that capture both absolute size as well as changes in size during an observed period of time can be contemplated. For example, the following features can be considered:

Maximum, minimum, average, and standard deviation of absolute size in megabytes
Rate of change in size from day of creation to day of prediction The rate of change in size may provide clues about lifespan. For example, if the size of a database does not change in the first two days, then it may be the case that the database will live longer than thirty days.

A virtual machine can belong to an edition and performance level, and a user may change the edition and performance level throughout its lifetime. Each performance level can be assigned a particular amount of resources. To address editions and performance levels the following features can be computed:

Number of editions/performance level changes
Number of distinct editions/performance levels
Edition at time of prediction
Performance level at the time of prediction
Difference between edition/performance level at the time of creation and edition/performance level at time of prediction
Maximum, minimum, and average resources assigned based on performance level In a platform-as-a-service (PaaS) context, virtual machine creation is associated with a subscription to the service. There can be several types of subscriptions such as trial, consumption, and benefit programs, among others. A feature can be created for each subscription type "t," which takes a value of "1" if the subscriptions associated with the virtual machine is of type "t" at the time the virtual machine is created, and "0" otherwise. Let "I" be a virtual machine for which we are computing features, "C" be the subscription associated with "I," "$T_c$" be the time in which "I" was created, and "$T_p$" be the time of prediction for "I." All virtual machines associated with a subscription "C" can be obtained. This includes virtual machines that are alive between "$T_c$" and "$T_p$," as well as virtual machines that were deleted before "$T_c$." These virtual machines can be grouped into three groups: 1) virtual machines created before "$T_c$" and deleted after "$T_c$," 2) virtual machines created before "$T_c$" and deleted any time (even before "$T_c$"), and 3) virtual machines that are created after "$T_c$" and before "$T_p$." Notice that group "1" is a subset of group "2." For each of these groups, the following features can be computed:

Number of virtual machines
Maximum, minimum, average, and standard deviation of the size of all virtual machines, wherein size is the maximum size that the virtual machine had for groups "1" and "2"
Maximum, minimum, average, and standard deviation of the lifespan of all databases in groups "1" and "2"

Features can also be crated to capture historical behavior of a user associated with the subscription. For instance, if all databases associated with a subscription live less than thirty days, then it is likely that a newly created database will also live less than thirty days.

As noted above, the longevity classifier component 120 can implement a random forest model. One benefit of a random forest model is that one can extract the importance of features. That is, which features are most predictive. Gini-importance can be used to measure feature importance. Gini-importance is defined as the total decrease in node purity averaged over all trees in the forest. A gini-index can be used to measure the node impurity, defined as "2 p(1−p)," where "p" is the proportion of positive examples in a node. In an exemplary implementation, it can be determined that subscription history, names, and creation time can be the most predictive features.

The most predictive features can be related to subscription history, which is the history of virtual machines owned by the subscription. This is intuitively expected. For instance, if all virtual machines associated with a subscription are short lived, then it is likely that a new virtual machine associated with this subscription will also be short lived. Also, the features indicating the number of databases created by the subscription have high importance.

The second most predictive features can be related to names. This confirms a hypothesis that it is useful to identify whether a virtual machine is created manually or by an automated process.

The third most predictive features can relate to creation time, specifically the hour of the day, day of the month, and week of the year in which a virtual machine is created. Hour of the day may indicate whether or not the virtual machines are created under automation versus during waking business hours. Similarly, virtual machines created during a regional holiday may also imply automated creation.

In one instance, a subset of features can be utilized to classify a virtual machine immediately after creation. Such features can include names, creation times, and subscription history, among others. Alternatively, classification can be deferred for a predetermined period of time such as two days. In this manner, data can be collected from a virtual machine in operation and provide further information to aid classification. In other words, given data produced by a virtual machine in the first "x" days after the virtual machine is created, a prediction is made as to whether the virtual machine is going to live more or less than "y" days and classify the virtual machine based thereon.

Accurate prediction is significant, since there may be high costs associated with incorrect classification decisions, such as a negative effect on load balancing policies. Nevertheless, a classifier after initial training is unlikely to classify all virtual machines without error. The adaption component 220 provides a mechanism to update a classifier to account for any misclassifications. The adaptation component 220 analyzes the class and resources supplied to a virtual machine by way of a particular resource pool to determine if placement is appropriate. Further, the adaptation component 220 can provide feedback to the training component 210 to enable refinement of one or more longevity classifier components 120, when appropriate.

Figure 3:
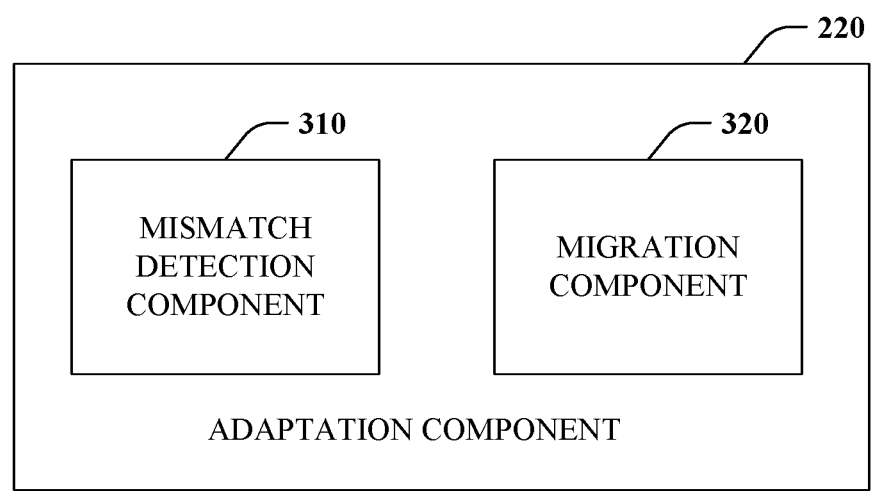
FIG. 3 is a schematic block diagram of an exemplary adaptation component.

Turning attention to FIG. 3 the adaptation component 220 is depicted in further detail. As shown, the adaptation component 220 includes mismatch detection component 310 and migration component 320. The mismatch detection component 310 is configured to detect mismatches between a classification of a virtual machine and the resource pool that backs the virtual machine at the time of analysis. In one instance, there can be a one-to-one relationship between longevity class and resource pool. At a time after initial classification and provisioning of resources, the virtual machine can be reclassified based on currently available information. Consider, for example, a virtual machine that is deleted shortly after creation, which was classified as a long-lived virtual machine and resources designated for the virtual machine from a long-lived virtual machine resource pool. The virtual machine was thus misclassified. Similarly, consider a virtual machine that continues to exist longer than thirty days, but was previously classified as a short-term virtual machine with an expected lifespan less than thirty days and resources provided from a short-term resource pool. This virtual machine is also misclassified. The mismatch detection component 310 can detect these types of mismatches and resource pool provisioning.

The migration component 320 can at least initiate migration of virtual machine resources from one resource pool to another resource pool of the resource pools 150. Consider the case where the lifespan of a virtual machine is longer than expected and the virtual machine has not been deleted. For example, the virtual machine was classified as short lived, but the lifespan has exceeded a maximum threshold for a short-lived classification and now has a long-lived lifespan. In this case, resources provisioned for the virtual machine can be migrated from a short-lived resource pool to a long-lived resource pool. In another instance, a virtual machine can initially be classified as unknown and resources from a corresponding resource pool provisioned for the virtual machine. For example, a virtual machine may be classified as unknown if there is not enough information available at the time to determine another class such as short lived or long lived. Alternatively, all virtual machines could be initially classified as unknown by default and attempted to be reclassified after a predetermined time, such as two days, after creation. In any event, resources provisioned for a virtual machine classified as unknown can be migrated from an unknown resource pool to a known resource pool (e.g., short lived, long lived . . . ).

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. For example, a longevity classifier component 120 could be configured to include functionality of class component 130 such that the output of a longevity classifier is a class that meets a specified level of predictive confidence. Communication between systems, components and/or sub-components can be accomplished in accordance with a push and/or pull model. The components may also interact with one or more other components not specifically described herein for the sake of brevity, but known by those of skill in the art.

Furthermore, various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, a longevity classifier component 120 can employ such technologies to learn expected lifespans of virtual machines and particular implementations including cloud service databases.

Figure 4:
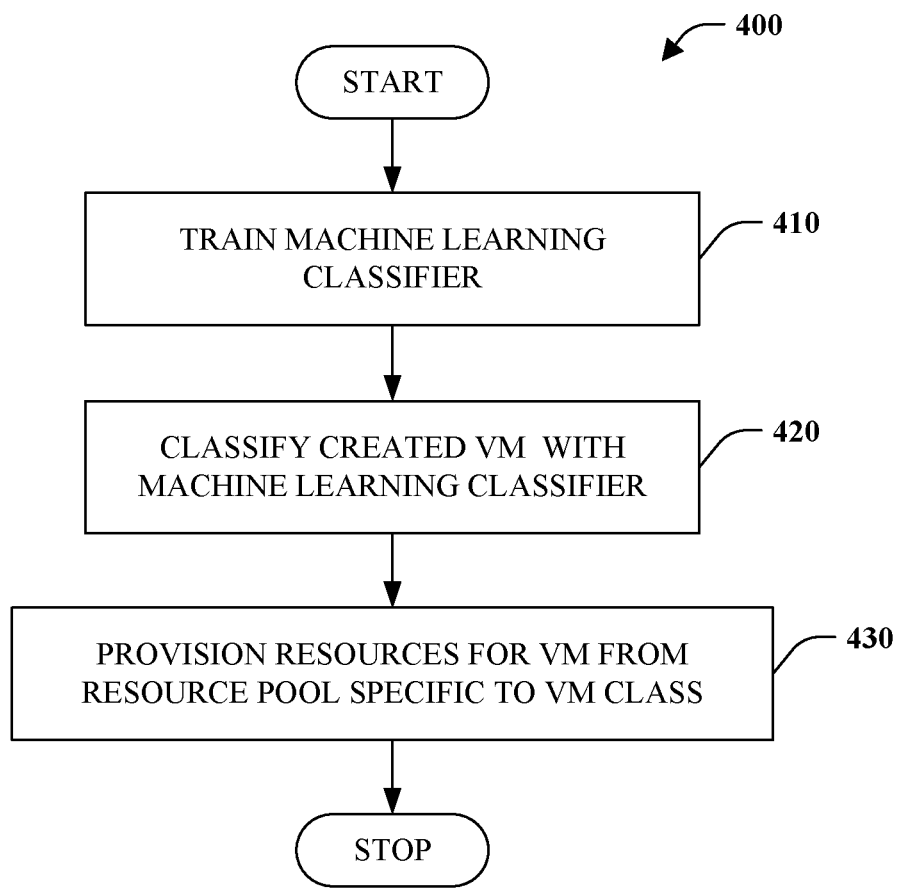
FIG. 4 is a flow chart diagram of a method of resource provisioning.
Figure 5:
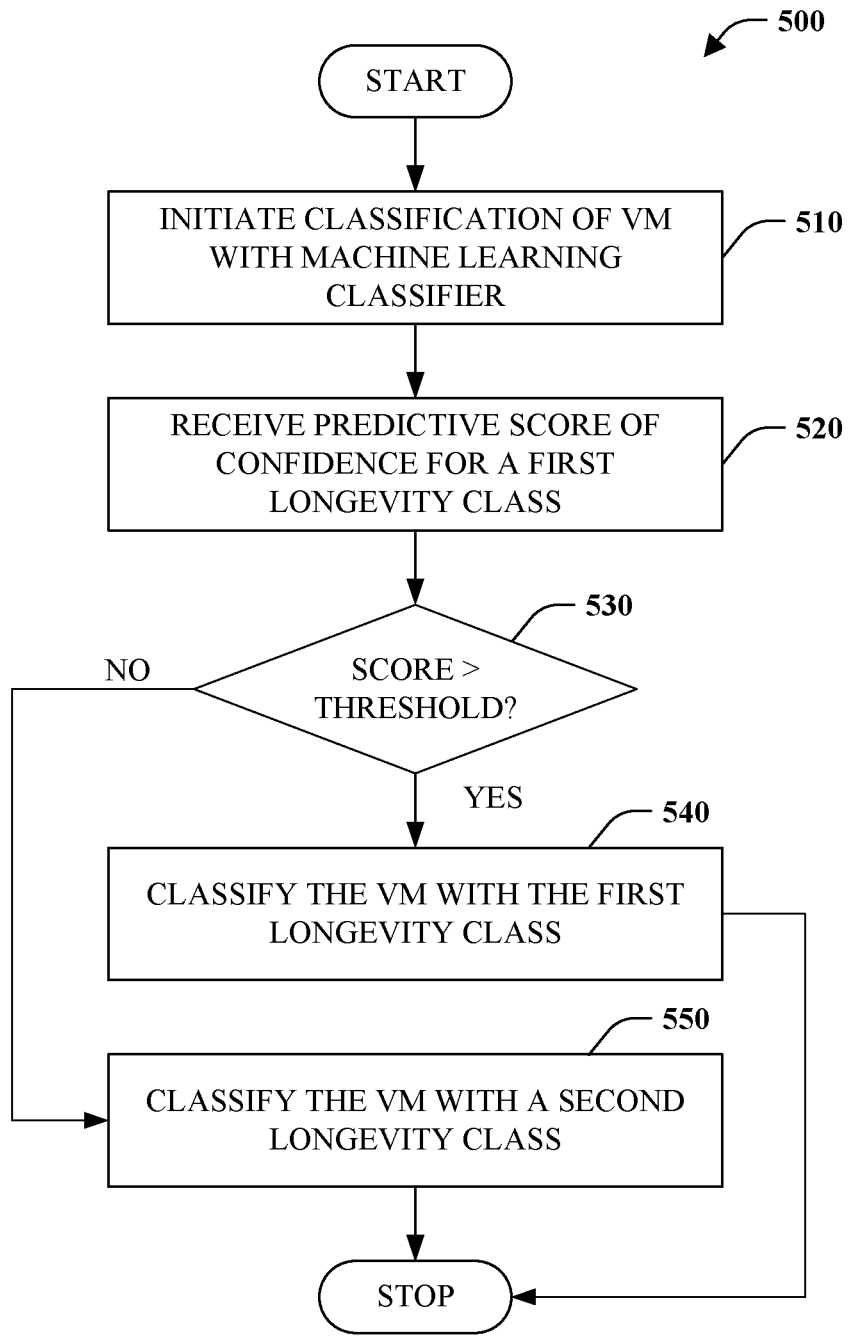
FIG. 5 is a flow chart diagram of a method of classification.
Figure 6:
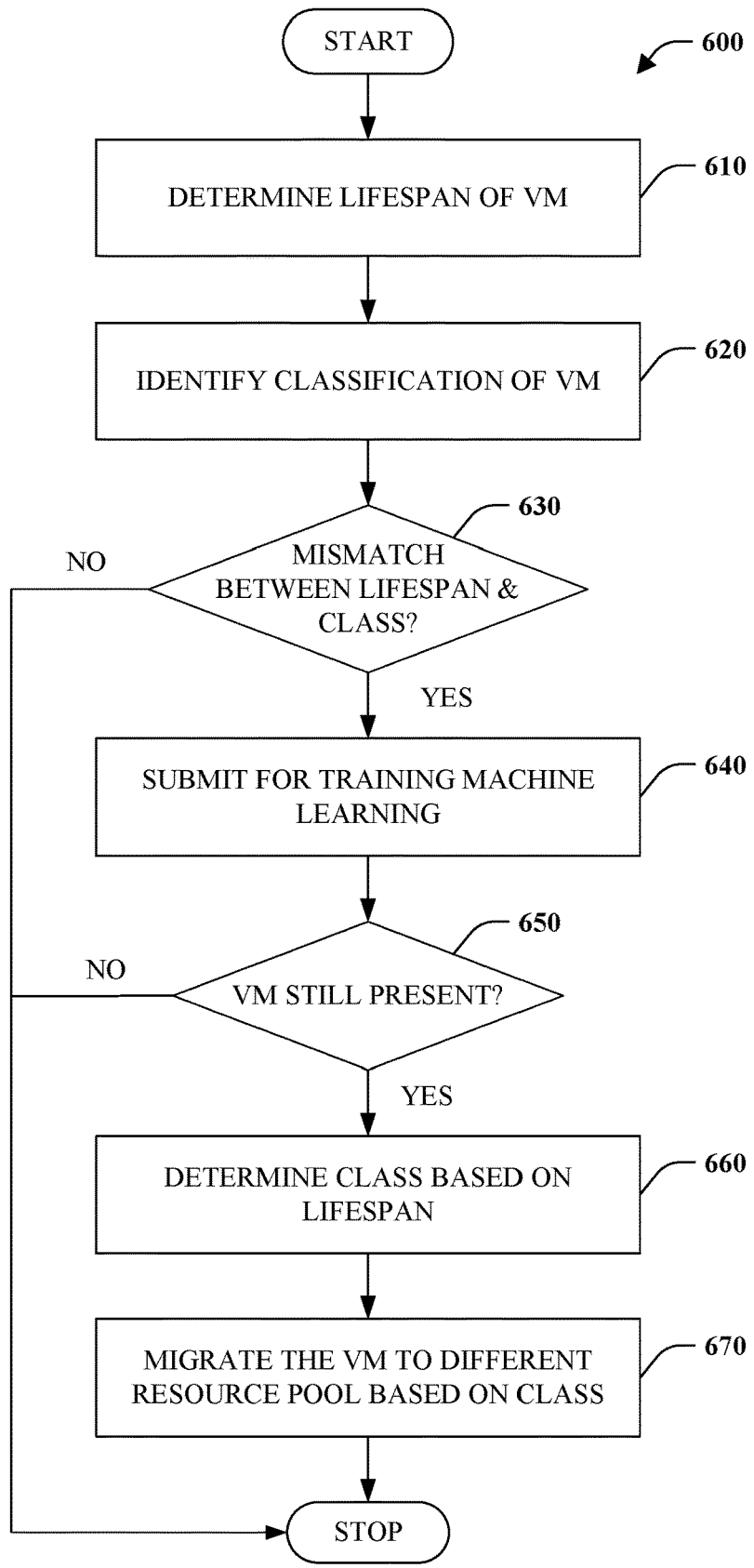
FIG. 6 is a flow chart diagram of a method of adaptive resource provisioning.

In view of the exemplary systems described above, methodologies that may be implemented in accordance with the disclosed subject matter will be better appreciated with reference to the flow charts of FIGS. 4-6. While for purposes of simplicity of explanation, the methodologies are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter.

FIG. 4 illustrates a method of resource provisioning 400. At reference numeral 410, a machine learning classifier is trained. A machine learning classifier, such as the longevity classifier component 120 in FIG. 1, can be trained automatically with training data, or training examples, to learn expected lifespans of virtual machines. In a supervised learning approach, the training can include various features of a virtual machine and the lifespan of the virtual machine. Various machine learning technologies can be employed in this context including a random weighted classifier, neural network, Bayesian network, and knowledge-based system, among others. In one embodiment, a random forest can be employed. A random forest is a collection of decision trees, wherein each tree learns independently using a subset of features and the final prediction is obtained by aggregating over predictions of all trees.

At reference numeral 420, the trained machine-learning classifier can be employed to classify a virtual machine (VM). The classification concerns the expected lifespan, or longevity, of a virtual machine. The classification can ascribe a virtual machine to one of two or more classes. For example, the classes can include short lived (e.g., thirty days or less), long lived (e.g., greater than thirty days), or unknown. Of course, other classes, including a middle class between long lived and short lived, are also possible. Furthermore, one or more machine learning classifiers can be employed. For example, a single machine learning classifier can classify a virtual machine as either short lived or long lived, or a first machine learning classifier can classify short-lived virtual machines while a second machine learning classifier classifies long-lived virtual machines.

At reference numeral 430, resources are provisioned for virtual machines based on classification. Hardware resources can be partitioned or grouped into a number of resource pools. The hardware resources correspond to compute and storage resources such as central processing units, memory, and hard drives among other things. The resource pools can be designated for a particular longevity class ascribed to a virtual machine and as such there can be a one-to-one relationship between resource pools and longevity classes. For instance, one pool can correspond to a short-lived class, another pool can correspond to a long-lived class, and yet another pool can correspond to an unknown class. In operation, resources are provided for a virtual machine based on the longevity class ascribed to the virtual machine such that resources originate from a pool that corresponds to the longevity class. In this way, resources can be provisioned intelligently for different groups of virtual machines guided by longevity.

FIG. 5 is a flow chart diagram of a method of classification 500. At reference numeral 510, classification of a virtual machine is initiated with a machine learning classifier. Classification can be triggered by creation of a virtual machine (VM), or particular instance thereof such as a database. In one instance, classification, can be done immediately after creation of the virtual machine, for example based on a subset of features, such as name and subscription history. Alternatively, classification can be initiated after a predefined period of time after creation, such as two days, to allow collection of further information to aid in classification. At numeral 520, a predictive confidence score for a first longevity class is received. At 530, the score is compared with a threshold. If the score is greater than the threshold ("YES"), the method continues at 540, where the virtual machine is classified with a first longevity class. For example, if the machine learning classifier associated with long-lived virtual machines, returns a confidence score of ninety-five and the threshold is ninety-four, the virtual machine can be classified as long lived with confidence. If the score is not greater than the threshold ("NO"), the method continues at 550, where the virtual machine is classified with a second longevity class. For instance, the virtual machine can be ascribed to a short-lived class since the confidence score was not greater than the threshold indicative of a long-lived class.

FIG. 6 illustrates a method of adaptive resource provisioning 600. At reference numeral 610, the lifespan for a virtual machine or instance thereof is determined. In one instance, a service provider can track creation and deletion dates of virtual machines at least for billing purposes. In the case that both creation and deletion dates are available, lifespan can be computed as the difference between those dates. In a situation in which only the creation time is available, the lifespan can be computed to be at least the difference between the creation time and the current time. At numeral 620, the class of the virtual machine is identified. The class can be identified from metadata associated with the virtual machine or acquired indirectly based on the particular resource pool supplying resources to the virtual machine. At numeral 630, a determination is made as to whether or not a mismatch exists between the lifespan and the class. In other words, the determination concerns whether the class is appropriate given the lifespan such that the virtual machine would be classified in the same longevity class for the determined lifespan. If there is no mismatch ("NO"), meaning the classification is appropriate, the method simply terminates. If there is a mismatch ("YES"), meaning the classification is not appropriate, the method proceeds to numeral 640. At numeral 640, the mismatch is submitted to the machine learning classifier for training. More particularly, information regarding the virtual machine, predicted class, and appropriate class provide feedback to enable refinement of the classifier. Although not depicted, in one instance, feedback can also be provided with respect to correct class matches so as not to bias the classifier toward instances that are difficult to classifier. At reference numeral 650, a determination is made as to whether the virtual machine is still present, or, in other words, has not been deleted. If the virtual machine is no longer present ("NO"), the method simply terminates. However, if the virtual machine is still present ("YES"), the method continues at 660 where a new class is determined based on current lifespan. Next, at 670, the virtual machine is migrated to a different resource pool based on the class. For instance, if the virtual machine was initially classified as short lived but continues to survive past a threshold for a short-lived classification, the virtual machine can be classified as long lived and migrated from a short-lived resource pool to a long-lived resource pool.

Aspects of the subject disclosure pertain to the technical problems of improving quality and efficiency of operations of a cloud service. The technical features associated with addressing these problems comprise automatically learning and characterizing the longevity of a virtual machine (or particular instance thereof), grouping virtual machines based on longevity, and mapping groups to designated hardware resource pools such that virtual machines with similar longevities are co-located.

The subject disclosure supports various products and processes that perform, or are configured to perform, various actions regarding provisioning computer resources guided by longevity. What follows are one or more exemplary systems and methods.

A computer resource provisioning system, comprising: a processor coupled to a memory, the processor configured to execute computer-executable instructions stored in the memory that when executed cause the processor to perform the following actions: detecting a request to create a virtual machine from a requestor; classifying the virtual machine into one of a plurality of longevity classes with a machine learning classifier that generates a predictive score based on data pertaining to one or more of the requestor or the virtual machine, wherein the longevity classes capture different lifespans of the virtual machine between when the virtual machine is created and when the virtual machine is deleted; and provisioning resources for the virtual machine from a hardware resource pool of a set of disjoint resource pools specific to the longevity class of the virtual machine. In the system, the plurality of longevity classes comprises a long-lived class and a short-lived class based on a predetermined time that corresponds to each class. Further, classifying the virtual machine as long lived or short lived can be based on comparison of the predictive score to a threshold, wherein the classifying is dependent on whether the predictive score is less than, equal, or greater than the threshold. The system can further comprise detecting a misclassification of a virtual machine based on lifespan, and updating the machine learning classifier automatically with the misclassification. In addition, the misclassified virtual machine can be moved to a different longevity class. The system can further comprise classifying a database service implemented by the virtual machine into the one or a plurality of longevity classes. Classifying the database service can be based on historical actions of the requestor, the name of the database, or the size of the database.

A method of resource provisioning performed by a system comprising at least one processor coupled to a memory storing machine-executable instructions, which, when executed by the processor, controls the system to perform acts, comprising: detecting a request to create a virtual machine from a requestor; classifying the virtual machine into one of a plurality of longevity classes with a machine learning classifier that produces a predictive score based on data pertaining to one or more of the requestor or the virtual machine, wherein longevity classes capture different predicted lifespans between when the virtual machine is created and when the virtual machine is deleted; and provisioning resources for the virtual machine from a hardware resource pool disjoint from other resource pools and specific to the longevity class of the virtual machine. The method further comprising classifying the virtual machine into one of the plurality of longevity classes comprising a short-lived class and a long-lived class based on a predetermined time that corresponds to each class. Further, classifying the virtual machine as long lived or short lived can be performed based on comparison of the predictive score to a threshold, wherein the classifying is dependent on whether the predictive score is less than, equal, or greater than the threshold. The method of further comprises detecting a misclassification of a virtual machine based on lifespan and updating the machine learning classifier automatically based on the misclassification. Further the misclassified virtual machine can be moved to a different longevity class corresponding with its current lifespan. The method further comprises classifying a database service implemented by the virtual machine into the one or a plurality of longevity classes. The classifying can further be performed based on at least one of historical actions of the requestor, name of the database, or size of the database provided by the database service.

A system for provisioning computer resources, comprising: means for classifying a virtual machine into one of a plurality of longevity classes with a machine learning classifier that produces a predictive score based on identity of a requestor that requests creation of the virtual machine and features of the virtual machine; and means for provisioning resources for the virtual machine from a hardware resource pool from a set of disjoint resource pools and designated for the longevity class of the virtual machine. The machine learning classifier of the system produces the predictive score further based on at least one of creation time, name of the virtual machine, or size of the virtual machine. The system further comprises: means for detecting misclassification of the virtual machine; and means for migrating virtual machine resources from a first resource pool to a second resource pool. The virtual machine of the system implements a database exposed as a network accessible service and the means for classifying and provisioning operate with respect to the database.

Survival analysis is a collection of statistical techniques for analyzing the expected duration of time until an event occurs. Survival analysis has traditionally been employed in life sciences and medical fields, where the focus is on survivability of individuals in a population that suffer from some condition or the outcome when treatment is provided. Herein, survival analysis is exploited to analyze the survivability of virtual machines, or instances thereof such as databases. In this case, the population comprises virtual machines and the event of interest is death of the virtual machine, namely by being deleted or dropped.

Survivability analysis tools are useful in determining the proportion of a population that will survive after a given time "t." However, complete data about lifespans of virtual machines is not available. Rather, solely the current lifespan duration can be observed. Accordingly, probability of survival can be utilized.

The survival function, defined as "$S(t)=P(T>t)$," gives the probability that the event of interest has not yet occurred at time "t" for a randomly chosen individual with a lifespan of "T." This survival function can be employed to analyze the lifespan of a virtual machine. For instance, the probability that a database will survive a given amount of time can be computed and compared with the probability of survivability of virtual machines in different populations (e.g., different editions/versions).

An experiment was conducted with respect to predicting the lifespan of a database in terms of long lived or short lived. Data produced by databases in three regions was obtained, wherein the regions are called region-1, region-2, and region-3. For each region, databases were divided into three groups according to database edition, namely basic, standard, and premium. Experiments were run on each subgroup, resulting in a total of nine sub-experiments (three regions and three subgroups per region). In the experiments, after two days a prediction was made as to whether a database will live more than thirty days. In other words, the experiments discriminated between short-lived and long-lived databases. A database is classified as positive if it lived more than thirty days, otherwise the database is classified as negative.

As per approach, a random forest model was used for each subgroup in the data set. The databases in each subgroup were divided into eighty percent training and twenty percent testing sets. Parameter tuning was performed for each model by doing grid search using five-fold cross-validation over the training set. The tuned model was then used to make predictions on the testing set. Each experiment was performed five times and average accuracy, precision, and recall over the testing set was reported. Accuracy is the ratio of correctly classified databases. Precision is the fraction of examples correctly as positive among all examples classified as positive. Recall is the fraction of examples correctly classified as positive among all actual positive examples.

A weighted random classifier was used as a baseline for comparison. The random classifier makes predictions the following way. It first computes the probability "p" that an example is positive solely based on the class distribution in the training data. For each example, in the testing set, it computes a random number "r" between zero and one. If "r<p," the random classifier classifies an example as positive. Otherwise, the example is classified as negative.

Below first presented is whole population results, where the population was trained and classified from a region as a whole. While results are good, improvement was sought. Subsequently, an approach was devised to determine when classifications were more reliable (e.g., confident) or less reliable (e.g., uncertain). Significant improvement was achieved when a classification is confident as compared to whole population scores.

With respect to results of the whole population, the random forest model significantly outperforms the baseline over all editions and all regions. Over basic edition, the random forest model obtains an average accuracy of "0.81" compared to "0.56" by the baseline, "0.83" precision compared to "0.68" by the baseline, and "0.92" recall compared to "0.68" by the baseline. Over standard edition, the random forest model obtains an average accuracy of "0.81" compared to "0.51" by the baseline, "0.79" precision compared to "0.44" for the baseline, and "0.88" recall compared to "0.56" by the baseline. Over the premium edition, the random forest model obtains an average accuracy of "0.80" compared to "0.55" by the baseline, "0.75" precision compared to "0.35" by the baseline, and "0.66" recall compared to "0.35" by the baseline.

Overall, the random forest model obtained an accuracy higher than "0.80." This means the model makes correct predictions at least eighty percent of the time. To better interpret the results, it is useful to look at the precision and recall scores. For instance, over basic edition, the subject model obtains precision of "0.83" and recall of "0.92" on average. This means that from databases the subject model predicts to live longer than thirty days, eighty-three percent of these predictions are correct. Further, the model is able to identify ninety-two percent of databases that live longer than thirty days.

Over the premium edition, it is difficult to predict whether a database will be long lived or not. This is reflected in low recall scores. There are two reasons for this. First, the population of premium databases is significantly smaller than the population for basic or standard databases. Therefore, there are fewer training examples. Second, the positive and negative class distribution is more imbalanced among premium databases than basic or standard databases. This is reflected by low scores obtained by the baseline.

To determine how well the subject model separates short-lived and long-lived databases, the databases in the testing set were divided according to their predicted class and compared them to a Kaplan-Meier survival curve for each group. The result of the comparison is that the subject model clearly is able to separate databases with relative success. However, the model is not perfect. To test how significantly different the classified groupings are, log-rank tests are performed. A log-rank test is a hypothesis test that compares the survival distribution of two samples, where the null hypothesis is that the survival distributions are identical. All classified groupings by the random forest model have p-values below "0.0000001." Therefore, the separation of the two classes is statistically significant. On the other hand, the classified groupings by the baseline have p-values greater than "0.05," which is not considered statistically significant.

It is desired that resource provisioning decisions be made based on predicted classifications of databases. There may be a high cost of making incorrect decisions. For instance, if a database that is predicted to be short lived actually lives more than thirty days, it may impact load balancing policies. Therefore, besides predicting the class of an example, some level of confidence about the prediction can be used. Random forests output an estimate of the probability that an example belongs to a class. This probability estimate can be used as a confidence level. Here, confidence level simply means the probability estimates generated by the subject model, which is different from its meaning in common statistical terms.

In this section, the confidence levels of the predictions are used to divide predictions into two groups: confident and uncertain. Confident predictions should have high confidence levels. That is, the model predicts that an example belongs to a class with high probability. Therefore, to mitigate misclassification costs, actions can be taken only on confident predictions. For instance, if the model predicts that a database will live more than thirty days with ninety-five percent probability, then this database can be safely moved to a server that contains only long-lived databases. Ideally, confident predictions should obtain high accuracy, precision, and recall scores.

In decision trees, the probability that an input example is classified as positive (negative) is equal to the fraction of positive (negative) examples in the leaf making the prediction. For instance, if there are ten examples in a leaf node and eight of them are positive, when the decision tree classifies an example as positive based on this leaf node, the probability is eighty percent. The class probabilities in a random forest are the result of averaging over class probabilities of the trees in the forest. An example is classified as positive if the probability of being positive is greater than "0.5"; otherwise it is classified as negative. These probabilities can be used as confidence levels for the predictions.

To determine whether a prediction is confident or uncertain, a threshold "t" is set where "$0.5 \leq t \leq 1$" and the threshold is used in the following way. Let "p" be the predicted probability that an example is classified as positive. As normal, if "p>0.5," the example is classified as positive; otherwise it is classified as negative. If $p \geq t$ or $p \leq 1-t$, the prediction is considered confident. On the other hand, if "$1-t<p<t$," the prediction is considered uncertain. That is, predictions where the predicted probability is close to "0.5" are considered uncertain. To determine the value for the threshold "t" the distribution of classes in training data can be used. Let "q" be the percentage of positive examples in the training data. Then, "t=max(q, 1−q)" can be set. For example, if seventy percent of the training examples are positive, then "q=0.7." Thus, "t=max(0.7, 0.3)=0.7."

Results show confident predictions consistently improve upon previous results that do not take confidence into account, in some cases reaching an accuracy of "0.92." The biggest gains were seen in basic and premium editions, where confident predictions cover on average sixty-three percent and seventy-one percent of all predictions, respectively. There is not much improvement over the standard edition because the distribution of short-lived and long-lived databases is balanced. That is, approximately the same amount of positive and negative examples. Therefore, the threshold for separating confident and uncertain predictions is low. This results in confident predictions covering almost all predictions. That is confirmed in that confident predictions in the standard edition cover on average ninety percent of all predictions. Interestingly, uncertain predictions still outperform the baseline in most cases, particularly the premium edition.

Confident predictions better separate standard and premium editions. This is reflected in higher accuracy, precision, and recall scores. Log-rank tests over confident classified groupings output p-values below "0.0000001," making the separating statistically significant.

On the other hand, uncertain predictions cannot successfully separate the standard and premium editions. Over the basic edition, the separation is still statistically significant. However, this is not the case over standard and premium editions. The separation is not statistically significant.

It is non-trivial to predict the lifespan of databases. Generally, users follow different patterns of behavior. Therefore, two databases may have completely different characteristics even though they belong to the same edition. Also, the population contains outliers that have different characteristics from all other databases. Even with these difficulties, it was shown that the random forest model was able to achieve eighty percent accuracy over all predictions, and in many cases ninety percent accuracy over confident predictions.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 7:
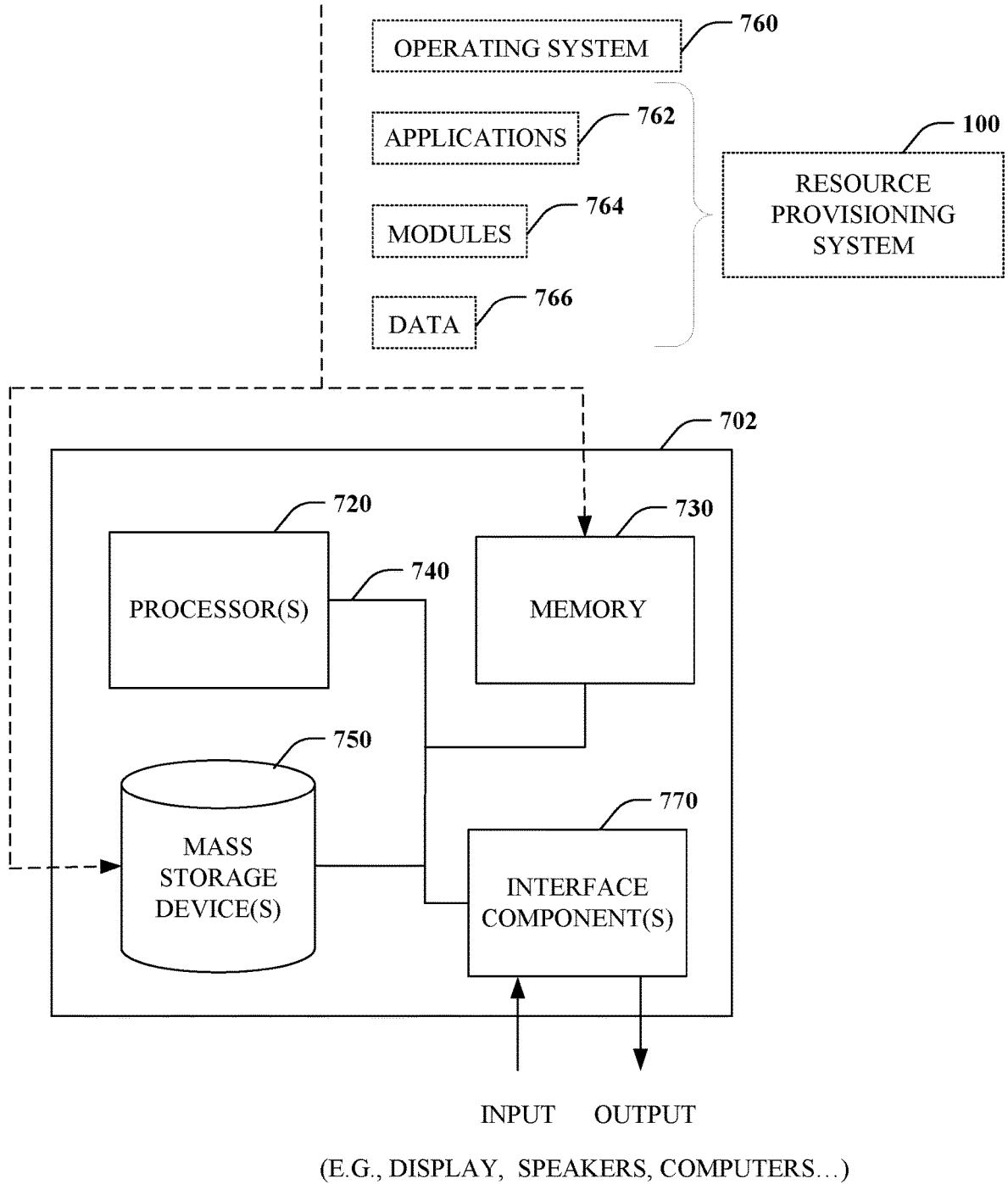
FIG. 7 is a schematic block diagram illustrating a suitable operating environment for aspects of the subject disclosure.

In order to provide a context for the disclosed subject matter, FIG. 7 as well as the following discussion are intended to provide a brief, general description of a suitable environment in which various aspects of the disclosed subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), smart phone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computers. In a distributed computing environment, program modules may be located in one or both of local and remote memory devices.

With reference to FIG. 7, illustrated is an example general-purpose computer or computing device 702 (e.g., desktop, laptop, tablet, watch, server, hand-held, programmable consumer or industrial electronics, set-top box, game system, compute node . . . ). The computer 702 includes one or more processor(s) 720, memory 730, system bus 740, mass storage device(s) 750, and one or more interface components 770. The system bus 740 communicatively couples at least the above system constituents. However, it is to be appreciated that in its simplest form the computer 702 can include one or more processors 720 coupled to memory 730 that execute various computer executable actions, instructions, and/or components stored in memory 730.

The processor(s) 720 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 720 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 720 can be a graphics processor.

The computer 702 can include or otherwise interact with a variety of computer-readable media to facilitate control of the computer 702 to implement one or more aspects of the disclosed subject matter. The computer-readable media can be any available media that can be accessed by the computer 702 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computer 702. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 730 and mass storage device(s) 750 are examples of computer-readable storage media. Depending on the exact configuration and type of computing device, memory 730 may be volatile (e.g., RAM), non-volatile (e.g., ROM, flash memory . . . ) or some combination of the two. By way of example, the basic input/output system (BIOS), including basic routines to transfer information between elements within the computer 702, such as during start-up, can be stored in nonvolatile memory, while volatile memory can act as external cache memory to facilitate processing by the processor(s) 720, among other things.

Mass storage device(s) 750 includes removable/non-removable, volatile/non-volatile computer storage media for storage of large amounts of data relative to the memory 730. For example, mass storage device(s) 750 includes, but is not limited to, one or more devices such as a magnetic or optical disk drive, floppy disk drive, flash memory, solid-state drive, or memory stick.

Memory 730 and mass storage device(s) 750 can include, or have stored therein, operating system 760, one or more applications 762, one or more program modules 764, and data 766. The operating system 760 acts to control and allocate resources of the computer 702. Applications 762 include one or both of system and application software and can exploit management of resources by the operating system 760 through program modules 764 and data 766 stored in memory 730 and/or mass storage device(s) 750 to perform one or more actions. Accordingly, applications 762 can turn a general-purpose computer 702 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the resource provisioning system 100, or portions thereof, can be, or form part, of an application 762, and include one or more modules 764 and data 766 stored in memory and/or mass storage device(s) 750 whose functionality can be realized when executed by one or more processor(s) 720.

In accordance with one particular embodiment, the processor(s) 720 can correspond to a system on a chip (SOC) or like architecture including, or in other words integrating, both hardware and software on a single integrated circuit substrate. Here, the processor(s) 720 can include one or more processors as well as memory at least similar to processor(s) 720 and memory 730, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the resource provisioning system 100 and/or associated functionality can be embedded within hardware in a SOC architecture.

The computer 702 also includes one or more interface components 770 that are communicatively coupled to the system bus 740 and facilitate interaction with the computer 702. By way of example, the interface component 770 can be a port (e.g. serial, parallel, PCMCIA, USB, FireWire . . . ) or an interface card (e.g., sound, video . . . ) or the like. In one example implementation, the interface component 770 can be embodied as a user input/output interface to enable a user to enter commands and information into the computer 702, for instance by way of one or more gestures or voice input, through one or more input devices (e.g., pointing device such as a mouse, trackball, stylus, touch pad, keyboard, microphone, joystick, game pad, satellite dish, scanner, camera, other computer . . . ). In another example implementation, the interface component 770 can be embodied as an output peripheral interface to supply output to displays (e.g., LCD, LED, plasma, organic light-emitting diode display (OLED) . . . ), speakers, printers, and/or other computers, among other things. Still further yet, the interface component 770 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A computer resource provisioning system, comprising:
a processor coupled to a memory, the processor configured to execute computer-executable instructions stored in the memory that when executed cause the processor to perform the following actions:
training a machine learning classifier to classify databases into a plurality of longevity classes based on a set of features that includes at least a number or rate of distinct characters included in names of the databases, wherein the longevity classes capture different database lifespans and wherein a database lifespan represents a length of time between when a database is created and subsequently deleted;
detecting a request to create a database from a requestor, the request including at least a name for the requested database;
classifying the requested database into one of the plurality of longevity classes with the machine learning classifier based at least on the name for the requested database; and
provisioning resources for the requested database from a hardware resource pool of a set of disjoint resource pools, wherein the hardware resource pool is specific to the longevity class of the requested database.

2. The system of claim 1, wherein the machine learning classifier generates a predictive score and the requested database is classified into one of the plurality of longevity classes based on comparison of the predictive score to a threshold.

3. The system of claim 1, wherein the plurality of longevity classes comprises a long-lived class and a short-lived class.

4. The system of claim 1, wherein the actions further comprise:
detecting a misclassification of a database based on lifespan; and
updating the machine learning classifier automatically with the misclassification.

5. The system of claim 4, wherein the actions further comprise migrating resources of a misclassified database from a first resource pool to a second resource pool, wherein the second resource pool corresponds to a new class based on a current lifespan.

6. The system of claim 1 wherein the requested database is a database provided by a cloud database service.

7. The system of claim 1 wherein the classifying further comprises classifying the requested database based on historical actions of the requestor.

8. The system of claim 1 wherein the classifying further comprises classifying the requested database based on a size of the requested database.

9. The system of claim 1, wherein the machine learning classifier implements a random forest model to classify databases.

10. A method of resource provisioning comprising:
training a machine learning classifier to classify databases into a plurality of longevity classes based on a set of features that includes at least a presence of non-alphanumeric symbols included in names of the databases, wherein the longevity classes capture different database lifespans and wherein a database lifespan represents a length of time between when a database is created and subsequently deleted;
detecting a request to create a database from a requestor, the request including at least a name for the requested database;
classifying the database into one of the plurality of longevity classes with the machine learning classifier based at least on the name for the requested database; and
provisioning resources for the requested database from a hardware resource pool from a set of disjoint resource pools, wherein the hardware resource pool is specific to the longevity class of the requested database.

11. The method of claim 10 wherein the classifying is based on a comparison of a predictive score produced by the machine learning classifier to a predetermined threshold.

12. The method of claim 10 wherein the plurality of longevity classes comprises a short-lived class and a long-lived class.

13. The method of claim 10 further comprising:
detecting a misclassification of a database based on its current lifespan; and
updating the machine learning classifier automatically based on the misclassification.

14. The method of claim 13 further comprising moving a misclassified database to a different longevity class corresponding with its current lifespan.

15. The method of claim 10 wherein the requested database is a database provided by a cloud database service.

16. The method of claim 10 wherein the classifying is based on at least one of historical actions of the requestor or size of the requested database provided by the database.

17. A system for provisioning computer resources, comprising:
- a classifier training system for training a machine learning classifier to classify databases into a plurality of longevity classes based on a set of features that includes a number and rate of distinct characters included in names of the databases, wherein the longevity classes capture different database lifespans and wherein a database lifespan represents a length of time between when a database is created and subsequently deleted;
- means for classifying a requested database into one of the plurality of longevity classes with the machine learning classifier based on identity of a requestor that requests creation of the requested database and features of the database including at least a name of the requested database specified by the requestor; and
- means for provisioning resources for the requested database from a hardware resource pool from a set of disjoint resource pools, wherein the hardware resource pool is designated for the longevity class of the requested database.

18. The system of claim 17, wherein the machine learning classifier further produces a predictive score and the requested database is classified into one of the plurality of longevity classes based on comparison the predictive score to a predetermined threshold.

19. The system of claim 18, wherein the machine learning classifier produces the predictive score further based on at least one of creation time or size of the requested database.

20. The system of claim 17 further comprising:
- means for detecting misclassification of a database; and
- means for migrating database resources from a first resource pool to a second resource pool corresponding to a new class based on a current lifespan of the misclassified database.

* * * * *